(12) United States Patent
Atsatt et al.

(10) Patent No.: US 8,020,156 B2
(45) Date of Patent: Sep. 13, 2011

(54) BULK LOADING SYSTEM AND METHOD

(75) Inventors: Bryan Atsatt, Half Moon Bay, CA (US); David Leibs, San Mateo, CA (US); Jasen Minton, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1228 days.

(21) Appl. No.: 11/225,144

(22) Filed: Sep. 12, 2005

(65) Prior Publication Data

US 2007/0061797 A1  Mar. 15, 2007

(51) Int. Cl.
*G06F 9/44* (2006.01)
(52) U.S. Cl. .............................. 717/166; 717/148; 718/1
(58) Field of Classification Search .................... 717/166
See application file for complete search history.

(56) References Cited

U.S. PATENT DOCUMENTS

| | | | |
|---|---|---|---|
| 5,488,711 A | 1/1996 | Hewitt et al. | |
| 6,081,807 A | 6/2000 | Story et al. | |
| 6,321,323 B1 | 11/2001 | Nugroho et al. | |
| 6,442,565 B1 | 8/2002 | Tyra et al. | |
| 6,718,364 B2 | 4/2004 | Connelly et al. | |
| 6,738,977 B1 | 5/2004 | Berry et al. | |
| 6,748,396 B2 * | 6/2004 | Klicnik et al. ............ | 707/103 Y |
| 6,915,511 B2 | 7/2005 | Susarla et al. | |
| 6,973,646 B1 | 12/2005 | Bordawekar et al. | |
| 7,035,870 B2 | 4/2006 | McGuire et al. | |
| 7,039,923 B2 * | 5/2006 | Kumar et al. ................. | 719/331 |
| 7,069,550 B2 | 6/2006 | Fraenkel et al. | |
| 7,316,010 B1 | 1/2008 | Daynes et al. | |
| 7,398,523 B2 * | 7/2008 | Martin et al. ................. | 717/166 |
| 7,516,331 B2 * | 4/2009 | Jin et al. ........................ | 713/187 |
| 7,644,403 B2 | 1/2010 | Atsatt | |
| 7,784,043 B2 | 8/2010 | Atsatt | |
| 7,814,472 B2 | 10/2010 | Atsatt | |
| 2003/0121031 A1 | 6/2003 | Fraenkel et al. | |
| 2005/0021487 A1 | 1/2005 | Verma et al. | |
| 2005/0027757 A1 | 2/2005 | Kiessig et al. | |
| 2005/0028152 A1 | 2/2005 | Hays et al. | |
| 2005/0060698 A1 | 3/2005 | Boykin et al. | |
| 2005/0154785 A1 * | 7/2005 | Reed et al. ..................... | 709/217 |

(Continued)

OTHER PUBLICATIONS

"About the OSGi Service Platform," Technical Whitepaper, Revision 3.0, Jul. 12, 2004, OSGI Alliance, pp. 1-17.*

(Continued)

*Primary Examiner* — Michael J Yigdall
(74) *Attorney, Agent, or Firm* — Kilpatrick Townsend & Stockton LLP (57) ABSTRACT

A method and system for providing an efficient and convenient mechanism for class loading is presented. A present system and method virtual machine includes a bulk class loading component, normal class loader and execution engine. The bulk class loading component performs bulk loading of classes in a single pass of respective code sources. The normal class loader performs normal class loading activities, including normal class hierarchy tree searches and single class loading with multiple search traversals. In one embodiment, a bulk class identification component identifies classes for bulk loading. Classes can be identified for bulk class loading based upon designated characteristics or attributes. For example, a designated characteristic can include a class that is loaded between two points in time (e.g., from startup to a predetermined time after startup). The designated characteristic can be a relationship to other classes, including dependency relationships to classes identified for bulk loading based upon other criteria.

24 Claims, 3 Drawing Sheets

U.S. PATENT DOCUMENTS

| | | | |
|---|---|---|---|
| 2006/0070051 | A1 | 3/2006 | Kuck et al. |
| 2006/0143622 | A1* | 6/2006 | Prabandham et al. ........ 719/328 |
| 2006/0206903 | A1 | 9/2006 | Lawrence et al. |
| 2006/0248140 | A1 | 11/2006 | Birenheide |
| 2007/0006203 | A1 | 1/2007 | Marwinski |
| 2010/0070960 | A1 | 3/2010 | Atsatt |
| 2011/0023020 | A1 | 1/2011 | Atsatt |

OTHER PUBLICATIONS

David Hovenmeyer and William Pugh, "More Efficient Network Class Loading through Bundling," Proceedings of the 2001 Symposium on JavaTM Virtual Machine Research and Technology Symposium—vol. 1, 2001, (13 pages).*

OSGI Alliance; "OSGI Service Platform Core Specification;" Aug. 2005, pp. 1-276.

Atsatt, Bryan, et al., "Classloading in Oracle9iAS Containers for J2EE", Jan. 2003, Oracle Corp., retrieved online at http://oracle.com/technology/tech/java/oc4j/pdf/ClassLoadingInOC4J_WP.pdf, an Oracle White Paper, 24 pages.

Hall, Richard S. "A Policy-Driven Class Loader to Support Deployment in Extensible Frameworks", May 3, 2004, Springer Berlin / Heidelberg, Lecture Notes in Computer Science: Component Development, vol. 3083/2004, pp. 81-96.

"JAR File Specification", Sun Microsystems, retrieved online at http://web.archive.org/web/20000815091814/http://java.sun.com/j2se/1.3/docs/guide/jar/jar.html, 11 pages.

Krause, Jens and Plattner, Bernhard, "Safe Class Sharing among Java Processes," Research Report, Apr. 24, 2000, http://www.zurich.ibm.com/pdf/rz3230.pdf, pp. 1-14.

U.S. Appl. No. 11/225,143, filed Sep. 12, 2005, Office Action mailed Jun. 26, 2009, 13 pages.

U.S. Appl. No. 11/225,143, filed Sep. 12, 2005, Final Office Action mailed Jan. 20, 2010, 9 pages.

U.S. Appl. No. 11/225,143, filed Sep. 12, 2005, Advisory Action mailed Apr. 5, 2010, 3 pages.

U.S. Appl. No. 11/225,535, filed Sep. 12, 2005, Office Action mailed Jun. 23, 2009, 9 pages.

U.S. Appl. No. 11/225,535, filed Sep. 12, 2005, Final Office Action mailed Dec. 28, 2009, 19 pages.

U.S. Appl. No. 11/225,535, filed Sep. 12, 2005, Advisory Action mailed Mar. 12, 2010, 3 pages.

U.S. Appl. No. 11/224,853, filed Sep. 12, 2005, Office Action mailed Oct. 1, 2009, 16 pages.

U.S. Appl. No. 11/224,853, filed Sep. 12, 2005, Final Office Action mailed Mar. 30, 2010, 13 pages.

U.S. Appl. No. 11/224,853, filed Sep. 12, 2005, Notice of Allowance mailed Jun. 11, 2010, 7 pages.

U.S. Appl. No. 11/224,893, filed Sep. 12, 2005, Notice of Allowance mailed Aug. 20, 2009, 12 pages.

U.S. Appl. No. 11/225,535, filed Sep. 12, 2005, Notice of Allowance mailed Jun. 3, 2010, 9 pages.

U.S. Appl. No. 11/225,143, filed Sep. 12, 2005, Notice of Allowance mailed Jan. 20, 2011, 7 pages.

U.S. Appl. No. 11/225,144, filed Sep. 12, 2005, Office Action mailed Jan. 20, 2011, 11 pages.

* cited by examiner

Performing a bulk loading class identification process.

320

Tracking classes identified by the bulk loading class identification process of step 310.

330

Loading classes identified in the bulk loading class identification process of step 310 in a single pass.

FIG 3

BULK LOADING SYSTEM AND METHOD

BACKGROUND

1. Field of the Invention

The present invention relates to the field of data processing. More specifically, embodiments of the present invention relate to a Java class loading system and method.

2. Related Art

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. These advantageous results are often realized by computer systems implementing a virtual machine such as a Java virtual machine (JVM). A Java virtual machine is a process that runs on a host system executing binaries associated with class files. The JVM implements an abstraction referred to as a class loader that locates bytes associated with a class name and produces a translated representation of a Java class instance in a memory. However, traditional Java virtual machine class loading architectures can be relatively complex and involve a number of restrictive implementation requirements that often result in limited implementation flexibility and typically consume significant system resources.

Java programs typically include classes (e.g., "java. lang. String") and other data referred to as "resources". Classes and resources are usually loaded into a Java Virtual Machine (JVM) by a class loader. Each class loader ("loader") contains one or more "code-sources" (e.g., class/resource archives such as ".jar" or ".zip" files) from which to obtain class files to convert into class instances or resource data for application use. Class and resource names are typically prefixed by a "package" name, such as "java.lang" for the "String" class. Generally, many classes share a package name.

Java is an object oriented language in which classes are "specifications" (expressed as a piece of program code) that define common parameters or properties of objects included in the class. Some environments (e.g., Java two enterprise environments (J2EE)) typically permit concurrent execution of separate applications, where each application can involve multiple modules with Java classes packaged in various forms. The traditional rules governing isolation between these various components generally require the use of multiple "class loaders", each of which can hold only a single version of any given class. The classes that form a given version of a technology solution (e.g. an XML parser, such as Xerces) are generally packaged and distributed in one or more "code-source" root locations from which the classloader searches for classes. Code sources are generally anything that can be asked for a class or resource data and return it. For example, code sources can be defined to represent physical storage of binary class files, java sources that are compiled, or classes generated on the fly. A class loader in Java normally contains one or more "code-sources" (e.g., "Jar" or "zip" files) from which to load classes. A class loader uses each code source, along with a fully qualified class name (e.g., which includes a class package name) to define a location to search for classes.

Class loaders are typically arranged in a "tree" structure, with each loader having a single parent. When a class load event occurs, a loader is selected (called the "initiating" loader), and the standard search algorithm searches up the parent chain before searching the current ("initiating") loader. The first class matching the class name is returned. When a "child" contains the same class as one of its parents, the parent's version is traditionally selected effectively "masking" the child's copy. This searching hierarchy often takes a significant amount of time to traverse the different code sources that may contain the appropriate class. There are a number of applications in which time is important and delays can have a significant impact on user experience with the system. For example, conventional startups of a server can take a significant amount of time in which a user has to wait for the system to complete initialization activities before the user can begin actual application processing.

Traditional systems also typically defer searching for a class until the class is first required for method execution. Classes often have dependencies on other classes and a virtual machine may resolve those dependencies during the loading of the dependent class, or again may further defer resolution until the dependency is first required. In either case, an additional class loading search is performed to find the class location. Deferred class loading until first use can be highly recursive with a significant number of code pathways that are either non-debug or native which can complicate diagnosis of common class loading failures resulting from configuration errors.

Complex environments that contain multiple class loaders can significantly complicate loading operations and increase the probability of inopportune time delays. For example, in a J2EE (Java 2 enterprise edition) it is often common for initiating loader to have many ancestors, each containing many code sources. Traversing many code sources to locate the class and the act of loading a class for the first time can consume significant processing time.

SUMMARY OF THE INVENTION

A method and system for providing an efficient and convenient mechanism for class loading is presented. In one embodiment of the present invention, a virtual machine includes a bulk loading component, normal class loader and execution engine. The bulk loading component performs bulk loading of classes in a single pass of respective code sources. The normal class loader performs normal class loading activities. For example, a normal class loader can include normal class hierarchy tree searches and single class loading with multiple search traversals of a code source. In one embodiment of the present invention, a bulk class identification component identifies classes for bulk loading. Classes can be identified for bulk class loading based upon designated characteristics or attributes. For example, a designate characteristic can include a class that is loaded between two points in time (e.g., from startup to a predetermined time after startup). The designated characteristic can be a relationship to other classes, including dependency relationships to classes identified for bulk loading based upon other criteria.

Embodiments of the present invention can track classes for bulk storing in a manner that facilitate efficient bulk loading of classes. In one embodiment, a virtual machine includes a class bulk archiving component for tracking bulk loading classes. The class bulk archiving component can store and organize bulk class loading indications in a manner that facilitates efficient traversal of code sources during bulk loading activities.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "setting," "storing," "scanning," "receiving," "sending," "disregarding," "entering," or the like, refer to the action and processes of a computer system or similar intelligent electronic computing device, that manipulates and transforms data represented as physical (electronic) quantities within the computer system's registers and memories into other data similarly represented as physical quantities within the computer system memories or registers or other such information storage, transmission or display devices.

A present invention bulk loader system and method enables bulk loading of classes. The present invention method and system provides a bulk loading configuration that facilitates efficient traversal of code sources during bulk loading operations. For example, classes can be bulk loaded in a single pass of a first code source before loading classes from a second code source. Classes can be selected for bulk loading operations based upon a variety of characteristics or attributes. In one exemplary implementation, classes loaded during a designated time period (e.g., within a predetermined time of a virtual machine session initialization or startup) are identified for bulk loading at a later time (e.g., during subsequent virtual machine session initializations or startups). Classes with designated relationships or associations (e.g., dependencies) can also be identified for bulk loading.

Figure 1:
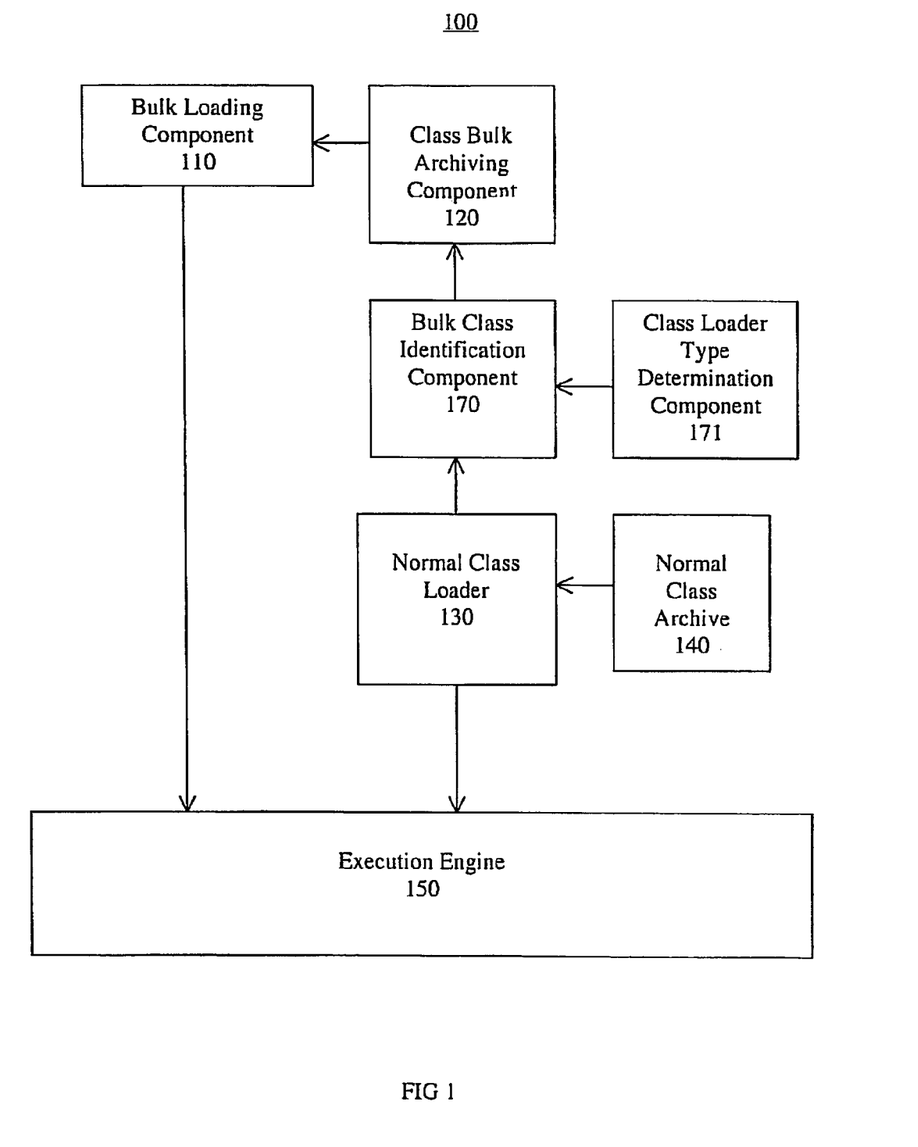
FIG. 1 is a block diagram of an exemplary virtual machine bulk loader system in accordance with one embodiment of the present invention.

FIG. 1 is a block diagram of a virtual machine bulk loader system 100, in accordance with one embodiment of the present invention. Virtual machine bulk loader system 100 includes bulk loading component 110, class bulk loading archiving component 120, normal class loader 130, normal class archive 140, bulk class identification component 170, and execution engine 150. Execution engine 150 is communicatively coupled to bulk loading component 110 and normal class loader 130 which in turn is communicatively coupled to normal class archive 140 and bulk class identification component 170. Bulk loading archiving component 120 is communicatively coupled to bulk loading component 110 and bulk class identification component 170.

The loaders of virtual machine bulk loader system 100 cooperatively operate to load classes for utilization by a Java virtual machine (JVM). Class bulk archiving component 120 archives classes for bulk loading. Bulk class identification component 170 identifies classes for bulk loading. Classes identified by bulk class identification component 170 are included or stored in class bulk archiving component 120. Bulk loading component 110 loads classes archived by class bulk archiving component 120. In one embodiment of the present invention, the classes are bulk loaded in one pass. Normal class loader 130 performs normal class loading. Normal class archive 140 stores classes utilized in normal loading activities by normal class loader 130. Execution engine 150 executes instructions included in the classes.

In one embodiment of the present invention, bulk class identification component 170 identifies classes that have a designated characteristic. For example, bulk class identification component 170 identifies a class that is loaded between two points in time (e.g., from startup to a predetermined time after startup). The designated characteristic can be a relationship to other classes. Bulk class identification component 170 can also resolve dependencies of classes identified as bulk load classes on another criteria (e.g., from startup to a point in time) and adds the dependent classes in the list of classes for inclusion in class bulk archiving component 120. In one exemplary implementation, bulk class identification component 170 can record the sequence of classes requested of a given loader from loader creation to a pre-determined cutoff time.

In one exemplary implementation, bulk class identification component 170 includes class loader type determination component 171 for determining a class loader type. Class loader type determination component 171 can also assign cutoff times or points to each type. For example, a class determination component 171 can assign a first time cutoff from start up to one type of class and a second time cutoff from start up to a second type of class.

In one embodiment, classes are organized for storage in class bulk archiving component 120 in a manner that facilitates efficient bulk loading. In one exemplary implementation, class bulk archiving component 120 is a value archive in which the actual values (e.g., opcode bytes) associated with a class are stored in the archive. In another exemplary implementation, class bulk archiving component 120 is a reference archive which includes references to code sources in which the classes can be found. For example, classes can be organized in a customized archive format for bulk loading in a manner that facilitates efficient traversal (e.g., one archive file to access in the case of a value archive, one access of respective code sources in the case of a reference archive) and class creation. The classes can also be organized in bulk archives for a server and applications deployed on that server. Bulk archiving component 120 can create the bulk-archive from a recorded or tracked sequence of classes.

In one embodiment, bulk class loading component 170 detects and performs the bulk class loading prior to normal class loading activities. For example, class bulk loading component 110 can search for the class bulk archiving component 120 at initialization (e.g., at system startup, server startup, etc.). In one exemplary implementation, class information included in a class archive component is loaded in one access of a value bulk loading archive file. In another exemplary implementation, classes indicated in a reference bulk loading archive file are loaded from respective code sources and all classes associated with a first code resource are loaded before proceeding to loading classes associated with a second code resource. Bulk loading component 110 can perform bulk class loading in a variety of virtual machine environments (e.g., JAVA two enterprise environment).

In one embodiment of the present invention, a shared loader system and method can be utilized to perform loading operations. For example, bulk class loading component 170 and normal class loader 130 can be utilized with a shared loader system and method in accordance with patent application entitled "A Shared Loader System and Method" patent application Ser. No. 11/225,143 filed concurrently with the present application, which is incorporated herein by this reference. The bulk class loading component 170 and normal class loader 130 can operate as generic loaders that can import the shared loaders which can be referenced by multiple generic loaders outside the normal parent chain permitting classes to be partitioned and shared across loader boundaries. In one embodiment of the present invention, the common notion of a jar as a library is extended to include a collection of jars and/or directories bound into a named and versioned shared loader. A generic loader can import one or more shared loaders and a polymorphic object can be utilized to perform loader searches. In one embodiment of the present invention, each instance of a loader is constructed with a single search-policy which is used by default when searching that instance. In one embodiment of the present invention, a policy class loader type is included which uses composition to achieve flexibility. In one embodiment, imported shared loaders are not consulted during a search initiated by a child generic loader.

Figure 2:
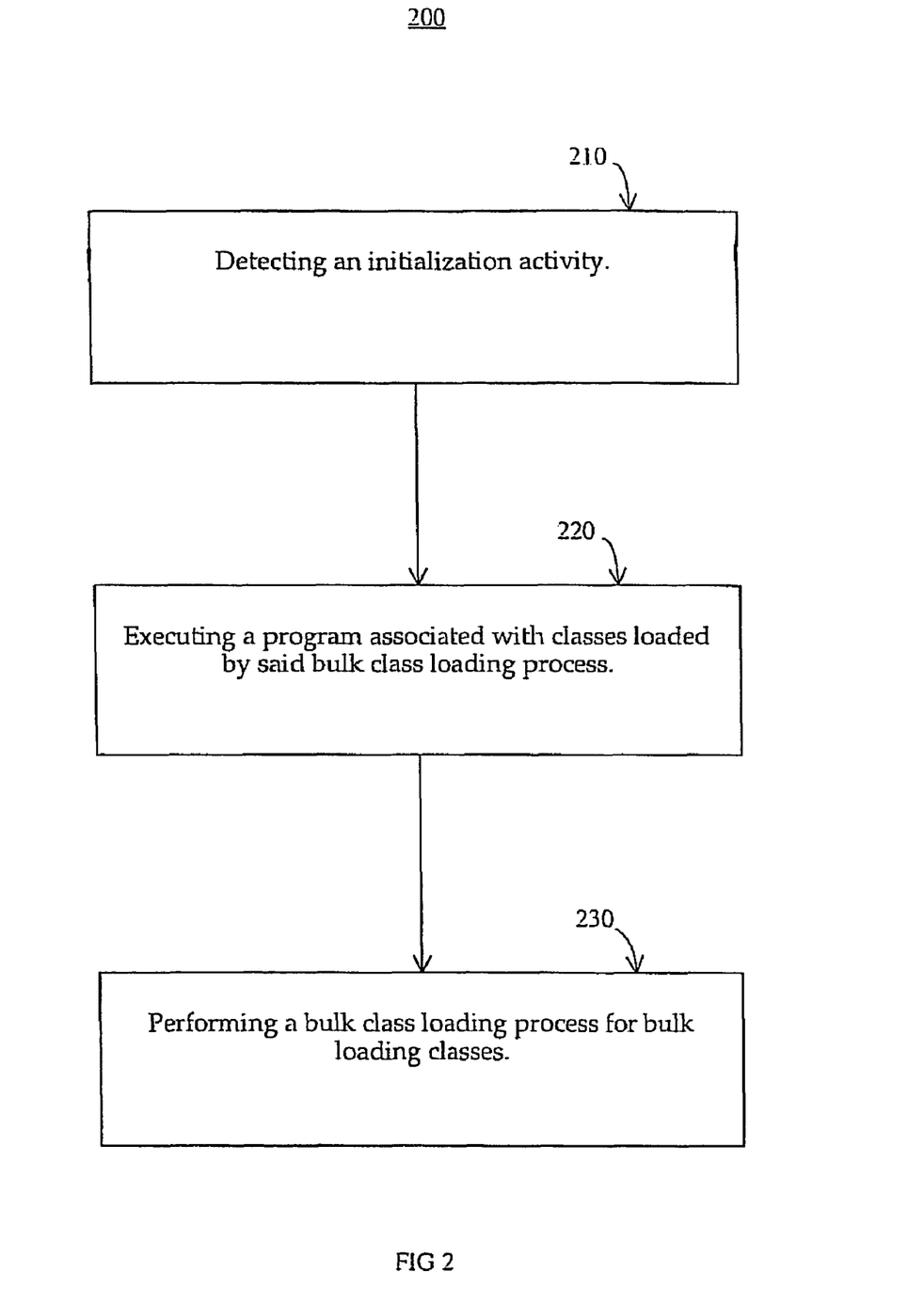
FIG. 2 is a flow chart of an exemplary virtual machine method in accordance with one embodiment of the present invention.

FIG. 2 is a flow chart of virtual machine method 200 in accordance with one embodiment of the present invention. Virtual machine method 200 facilitates bulk loading of classes in a virtual machine environment. In one exemplary implementation, virtual machine method 200 permits a plurality of classes to be loaded during startup in a manner that reduces otherwise duplicative loading efforts during normal operations.

In step 210, a bulk loading trigger activity is detected. In one embodiment of the present invention, a bulk loading trigger or initialization activity is an activity which causes a bulk loading process to begin. In one exemplary implementation, the bulk loading trigger or initialization activity is associated with a server startup or bootup. The initialization activity can be a "bootup" of a virtual machine (e.g., a Java virtual machine).

In step 220, a bulk class loading process is performed for bulk loading classes. In one embodiment, the bulk class loading process permits designated classes to be loaded in bulk in a single pass. For example, classes are identified for bulk loading based upon a designated characteristic or attribute and a plurality of classes are loaded in bulk. In the one exemplary implementation, class information is loaded in one access of an archive file. The classes can be loaded from a single code source before proceeding to other code sources. In one embodiment of the present invention, a bulk class loading process is defined by a class loading policy. Exemplary embodiments of a policy class loader (e.g., as described in patent application entitled "Method and System for Automated Root-Cause Analysis for Class Loading Failures in JAVA", patent application Ser. No. 11224,893 filed concurrently with the present application, and hereby incorporated by this reference) can be utilized by embodiments of the present invention. In one exemplary implementations instances of a class loader that a virtual machine may otherwise make by itself are replaced with instances created from a policy class loader type.

In step 230, a program associated with classes loaded by said bulk class loading process is executed. In one embodiment of the present invention, applications can choose specific versions of the classes. Objects created from a class in the bulk loader can also be shared across applications. In addition, different versions of various technologies (e.g., an XML parser, JDBC driver, etc.) within containers can be utilized by a plurality of applications. For example, a bulk loader can enable an application to choose a JDBC driver or XML parser other than those bundled in a base application.

Figure 3:
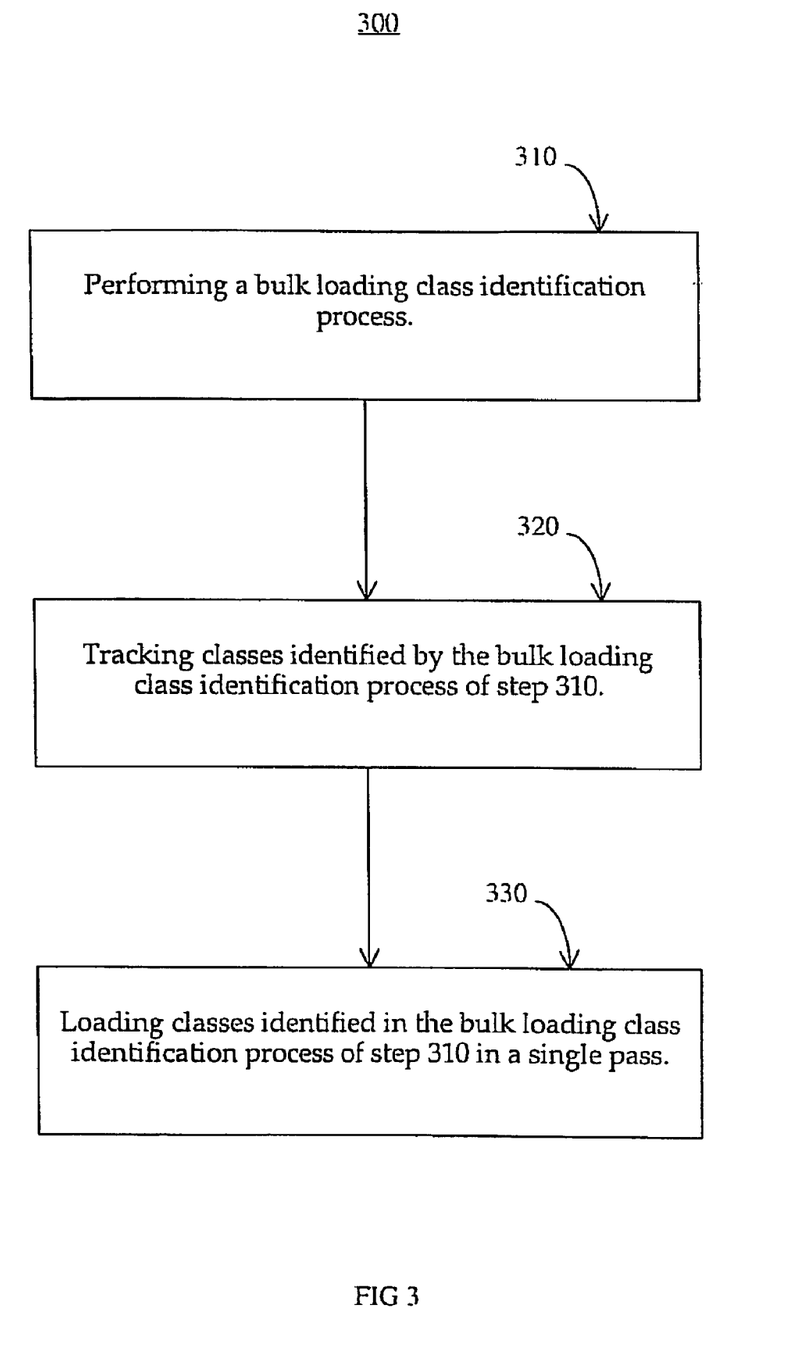
FIG. 3 is a flow chart of an exemplary bulk class loading process in accordance with one embodiment of the present invention.

FIG. 3 is a flow chart of bulk class loading process 300 in accordance with one embodiment of the present invention. In one embodiment of the present invention, bulk class loading process 300 facilitates efficient bulk loading of classes. For example, classes can be automatically loaded from in a single pass of an archive file and/or each respective code source without skipping back and forth between archive files and/or code sources during bulk loading operations. In one exemplary implementation, bulk class loading process 300 is utilized to perform a bulk class loading process of step 220.

In step 310, a bulk loading class identification process is performed. In one embodiment, the bulk loading class identification process includes identifying classes that have a designated characteristic. It is appreciated that there are a variety of possible designated characteristics. For example, a designated characteristic can be a time (e.g., from startup to a predetermined time after startup) at which a class was previously loaded. The designated characteristic can include associations between classes. In one exemplary implementation the associations can include dependencies between classes, classes that are associated with a program, and/or classes in a particular archive (e.g., OC4J archives).

The designated characteristic can include a class having a relationship indicated in metadata associated with another class identified for bulk class loading. For example, if during a first session, a first class is loaded during a designated time interval (e.g. a virtual machine system startup or initialization time), the first class is identified for bulk loading (e.g., during subsequent sessions). The bulk loading class identification process also can examine metadata associated with the first class to determine if other classes should also be bulk loaded. For example, if the metadata identifies a second class upon which the first class is dependent, the bulk loading class identification process can also identify the second class for bulk loading (e.g., during subsequent sessions). The relationship can include static dependencies.

In step 320, classes identified by the bulk loading class identification process of step 310 are tracked. For example, classes information identified in the bulk loading class identification process in association with normal class loading activities are stored in an archive. The class information can be a reference indication of a class and associated source code. The class information can also be actual values (e.g., op-codes, methods, attributes, parameters, etc.) of the class. The tracking can utilize a Java archive file to track and organize identified class information. The bulk loading class identification can be organized in the archive to facilitate efficient bulk loading. For example, class dependencies can be resolved and requisite dependency information included in an archive (e.g., a bulk class loading archive). Indications of classes for bulk loading can be organized in the archive so that classes from a first code source are read and loaded in a single bulk loading pass of the first code source before proceeding to load classes from a second code source.

In step 330, classes identified in the bulk loading class identification process of step 310 are loaded in a single pass. In one embodiment, classes are loaded in accordance with the organization (e.g., in sequential order) of identified classes tracked in step 320. For example, classes can be automatically loaded from a single access of a class bulk loading archive (e.g., from a value class bulk loading archive) and/or each source code in a single pass of each respective code source (e.g., from a reference class bulk loading archive).

In one embodiment, the present invention is implemented on a computer system including a processor for processing information, a computer readable medium (e.g., hard disk, random access memory, system memory, compact disk, digital video disk, flash memory, etc.) for storing information and a bus for communicating information between the processor and memory. The computer readable medium stores instructions for causing the processor to implement a virtual machine and perform bulk class loading, wherein the bulk class loading includes determining a set of bulk loading classes; tracking the set of bulk loading classes; and loading the set of bulk loading classes. The set of bulk loading classes can be loaded in a single pass of respective code sources. Determining a set of bulk loading classes can include identifying classes based upon a point in time in which the class is loaded, dependency relationships to other classes, and/or metadata indications. The bulk class loading can be performed before normal class loading activities. The bulk loading classes can be archived in a format customized for efficient traversal (e.g., archive in sequential order based upon code source association).

Thus, the present invention method and system provides an efficient and convenient mechanism for expediting class loading operations. The present invention systems and methods reduce traditional class loading times by automatically identifying and ordering a set of classes for bulk loading of multiple classes in a single access of an archive file and/or a single pass of a code source. The present solutions significantly reduce server and application startup times by eliminating much of the loader delays, file accesses and code-source traversal normally required to launch the server and individual applications. Embodiments of the present invention can also indirectly improve reliability as a significant factor in fault tolerant systems is the time to re-start a failed system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A class loading method for loading a plurality of classes, the method comprising:
    performing a hierarchical class loading process wherein single classes of the plurality of classes are loaded in each of one or more traversals of a code source;
    detecting a bulk loading trigger activity;
    performing a bulk class loading process for bulk loading two or more classes of the plurality of classes in response to detecting said bulk loading trigger activity, wherein the two or more classes are loaded in a single traversal of the code source; and
    executing a program associated with classes loaded by said bulk class loading process and said hierarchical class loading process.

2. The class loading method of claim 1 wherein said bulk class loading process comprises:
    performing a bulk loading class identification process;
    tracking classes identified by said bulk loading class identification process; and
    loading classes identified in said bulk loading class identification process.

3. The class loading method of claim 2 wherein said bulk loading class identification process includes identifying classes that have a designated characteristic.

4. The class loading method of claim 3 wherein said designated characteristic is a class loaded between a first point in time and a second point in time.

5. The class loading method of claim 4 wherein said first point in time is an a virtual machine initial start time.

6. The class loading method of claim 3 wherein said designated characteristic includes a class having a relationship indicated in metadata associated with a class.

7. The class loading method of claim 6 wherein said relationship is based upon static dependencies.

8. The class loading method of claim 2 wherein said classes are automatically loaded from a plurality of code sources in a single pass of each respective code source.

9. A system comprising:
    a processor; and
    a memory coupled with and readable by the processor and having stored therein a sequence of instructions which, when executed by the processor, cause the processor to load a plurality of classes by performing a hierarchical class loading process wherein single classes of the plurality of classes are loaded in each of one or more traversals of a code source, detecting a bulk loading trigger activity, performing a bulk class loading process for bulk loading two or more classes of the plurality of classes in response to detecting said bulk loading trigger activity, wherein the two or more classes are loaded in a single traversal of the code source, and executing a program associated with classes loaded by said bulk class loading process and said hierarchical class loading process.

10. The system of claim 9 wherein said bulk class loading process comprises:
performing a bulk loading class identification process;
tracking classes identified by said bulk loading class identification process; and
loading classes identified in said bulk loading class identification process.

11. The system of claim 10 wherein said bulk loading class identification process includes identifying classes that have a designated characteristic.

12. The system of claim 11 wherein said designated characteristic is a class loaded between a first point in time and a second point in time.

13. The system of claim 12 wherein said first point in time is an a virtual machine initial start time.

14. The system of claim 11 wherein said designated characteristic includes a class having a relationship indicated in metadata associated with a class.

15. The system of claim 14 wherein said relationship is based upon static dependencies.

16. The system of claim 10 wherein said classes are automatically loaded from a plurality of code sources in a single pass of each respective code source.

17. A computer-readable memory having stored thereon a sequence of instructions which, when executed by a processor, cause the processor to load a plurality of classes by:
performing a hierarchical class loading process wherein single classes of the plurality of classes are loaded in each of one or more traversals of a code source;
detecting a bulk loading trigger activity;
performing a bulk class loading process for bulk loading two or more classes of the plurality of classes in response to detecting said bulk loading trigger activity, wherein the two or more classes are loaded in a single traversal of the code source; and
executing a program associated with classes loaded by said bulk class loading process and said hierarchical class loading process.

18. The computer-readable memory of claim 17 wherein said bulk class loading process comprises:
performing a bulk loading class identification process;
tracking classes identified by said bulk loading class identification process; and
loading classes identified in said bulk loading class identification process.

19. The computer-readable memory of claim 18 wherein said bulk loading class identification process includes identifying classes that have a designated characteristic.

20. The computer-readable memory of claim 19 wherein said designated characteristic is a class loaded between a first point in time and a second point in time.

21. The computer-readable memory of claim 20 wherein said first point in time is an a virtual machine initial start time.

22. The computer-readable memory of claim 19 wherein said designated characteristic includes a class having a relationship indicated in metadata associated with a class.

23. The computer-readable memory of claim 22 wherein said relationship is based upon static dependencies.

24. The computer-readable memory of claim 18 wherein said classes are automatically loaded from a plurality of code sources in a single pass of each respective code source.

* * * * *

UNITED STATES PATENT AND TRADEMARK OFFICE
CERTIFICATE OF CORRECTION

PATENT NO.       : 8,020,156 B2                                     Page 1 of 1
APPLICATION NO.  : 11/225144
DATED            : September 13, 2011
INVENTOR(S)      : Atsatt et al.

It is certified that error appears in the above-identified patent and that said Letters Patent is hereby corrected as shown below:

In column 6, line 18, delete "11224,893" and insert -- 11/224,893 --, therefor.

In column 6, line 21, delete "implementations" and insert -- implementation, --, therefor.

Signed and Sealed this
Sixth Day of December, 2011

David J. Kappos
*Director of the United States Patent and Trademark Office*